(12) United States Patent
Schou

(10) Patent No.: US 7,301,246 B2
(45) Date of Patent: Nov. 27, 2007

(54) SWITCH FOR SWITCHING OFF AT LEAST ONE AIRBAG

(75) Inventor: Frank Schou, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/523,549

(22) PCT Filed: Feb. 20, 2003

(86) PCT No.: PCT/DE03/00521

§ 371 (c)(1),
(2), (4) Date: Mar. 17, 2006

(87) PCT Pub. No.: WO2004/016473

PCT Pub. Date: Feb. 26, 2004

(65) Prior Publication Data

US 2006/0202453 A1    Sep. 14, 2006

(30) Foreign Application Priority Data

Jul. 31, 2002  (DE) .............................. 102 35 854

(51) Int. Cl.
*B60L 1/00*  (2006.01)
*G01R 31/02*  (2006.01)
*G08B 21/00*  (2006.01)
*B60R 21/16*  (2006.01)

(52) U.S. Cl. .................. 307/10.1; 324/415; 340/687; 340/644; 280/735

(58) Field of Classification Search ................ 324/415; 340/687, 644; 307/10.1; 280/735
See application file for complete search history.

(56) References Cited

U.S. PATENT DOCUMENTS 5,109,199 A *  4/1992  Berger ......................... 324/415
5,982,048 A    11/1999  Fendt et al.
6,593,758 B2 *  7/2003  Mulera et al. ............... 324/713

FOREIGN PATENT DOCUMENTS

| DE | 298 12 034 | 10/1998 |
|----|------------|---------|
| DE | 198 35 709 | 11/1999 |
| DE | 199 60 179 | 6/2001  |

OTHER PUBLICATIONS

Compact Oxford English Dictionary, Oxford University Press, Published Jun. 23, 2005 retrived online Jan. 8, 2007.*

* cited by examiner

*Primary Examiner*—Michael Sherry
*Assistant Examiner*—Michael Rutland-Wallis
(74) *Attorney, Agent, or Firm*—Kenyon & Kenyon LLP

(57) ABSTRACT

A switch for switching off at least one airbag having two identical sensors for detecting a switching state of the switch is provided, the two identical sensors being connected up in such a way that the electrical characteristic-quantity ranges to be evaluated for detecting the switching state differ from each other. This is achieved with the aid of different resistor networks between the two sensors and a signal evaluation unit.

6 Claims, 1 Drawing Sheet

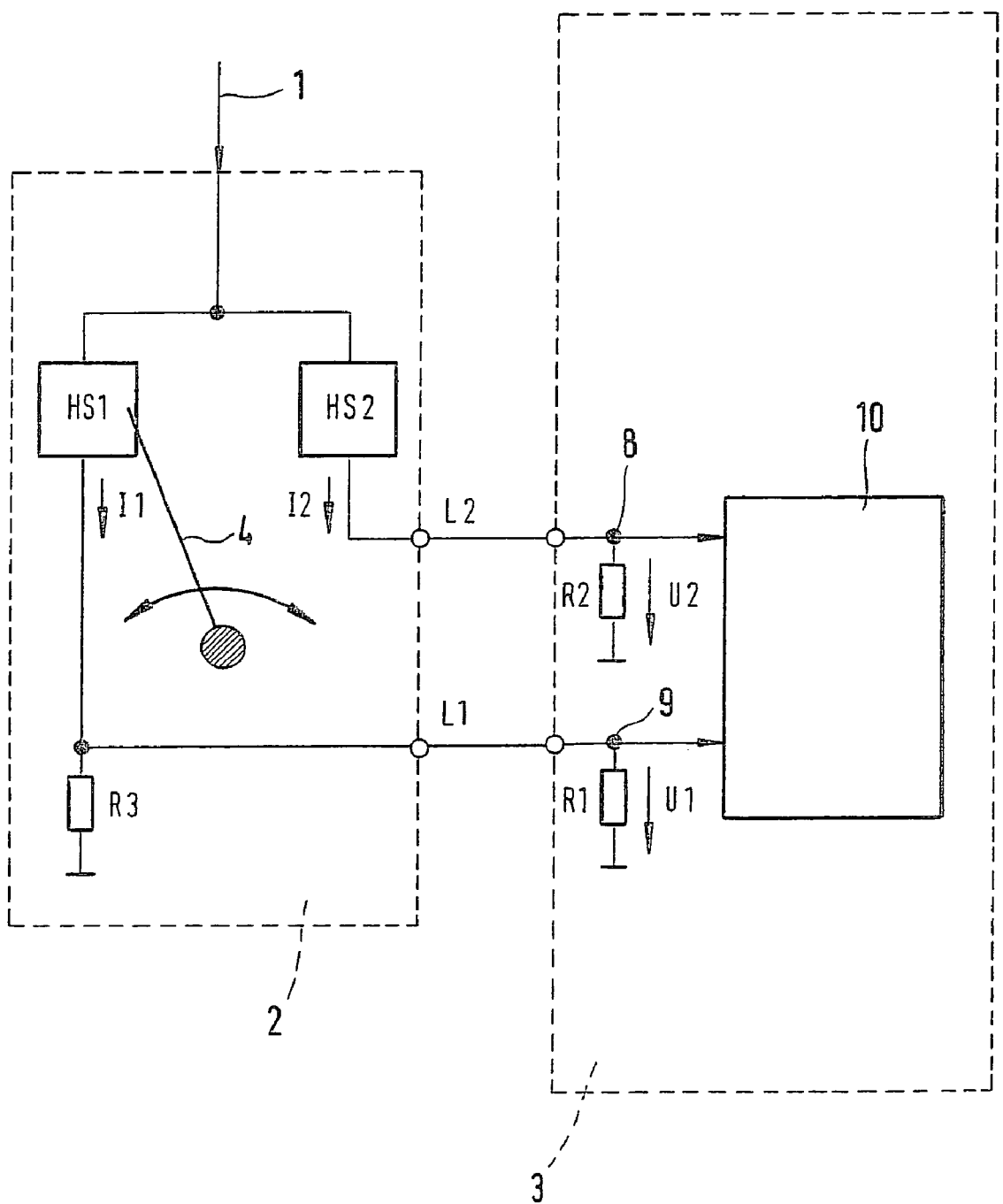

SWITCH FOR SWITCHING OFF AT LEAST ONE AIRBAG

FIELD OF THE INVENTION

The present invention is based on a switch for switching off at least one airbag.

BACKGROUND INFORMATION

The German Published Patent Application No. 199 60 179 describes a safety device for motor vehicles. According to this document, the motor vehicle features one or multiple airbags which can be deactivated via switching elements. These switching elements take the form of a deactivation switch.

SUMMARY OF THE INVENTION

By contrast, the switch of the present invention for switching off at least one airbag has the advantage that, when two identical sensors are used for evaluating the switching state of the switch, the wiring configuration of these sensors according to the present invention makes it possible to distinguish between the two sensors. This prevents in particular the possibility of mistakenly mixing up lines and thus also prevents incorrect decisions from being generated. Moreover, the design approach according to the present invention can be implemented at little additional expense and is thus distinctly advantageous.

Particularly advantageous is the fact that it is possible to distinguish between the two sensors by virtue of different resistor networks connecting each of the two sensors to a signal evaluation unit, for these different resistor networks then result in different characteristic ranges for the parameters to be evaluated. The resistor networks are designed in such a way that the electrical characteristic ranges do not overlap. This makes possible a clear distinction between the two sensors in the signal evaluation unit.

It is furthermore advantageous that the switch, as the different resistor network, features, in a branch between one of the sensors and the signal evaluation unit, a first resistor, which, in conjunction with a further resistor associated with the signal evaluation unit, forms a current divider. Thus it has become possible in the most simple manner that the current delivered by this sensor as an electrical parameter is in a different range than the current which is delivered to the signal evaluation unit by the second sensor and which does not feature a current divider. The first resistor may be advantageously located within the switch itself, for this allows the outputs of the switch to be easily identifiable from outside due to the delivered parameters.

Advantageously, the sensors take the form of Hall-effect sensors which allow for contactless switching and are thus more wear-resistant and robust.

BRIEF DESCRIPTION OF THE DRAWING

The FIGURE shows a block diagram of the switch according to the present invention, in which the switch is connected to a signal evaluation unit.

DETAILED DESCRIPTION

Today it is very common in vehicles to offer the option of deactivating the front passenger-side airbag or the rear side airbags using a switch. This is commonly referred to as the airbag deactivation switch. For this purpose, the position of a switch, in particular a key switch, is evaluated by the airbag control unit. Various concepts are currently known for implementing the switch. First there are switches having resistor networks, in which the switch switches between two different, i.e. asymmetrical resistive dividers, and then there are switches made up of one or two Hall-effect sensors. The switching here is contactless, i.e. the system switches, in a mechanically robust manner, back and forth between the two current ranges of the Hall-effect sensors. If the two Hall-effect sensors have the same form and if the resistor network between the sensors and the signal evaluation unit is also the same in each case, then it is impossible to detect from the outside which of the two lines or connection terminals of the switch belongs to which Hall-effect sensor. This can possibly lead to incorrect decisions.

According to the invention, a design approach is provided which makes it possible to distinguish the Hall-effect sensors and thus to improve an error detection. To this end, a different interconnection configuration is proposed between each of the sensors and the signal evaluation unit. This gives rise to different characteristic ranges for the parameters to be evaluated. That is to say that the current and/or voltage are different, given the same conditions of measurement. The wiring configuration may be designed in such a way that the characteristic ranges of the two sensors no longer overlap. This allows for an unequivocal assignment to the individual sensors. Particularly by introducing a current divider in one of the branches between the sensor and the signal evaluation unit was it possible to achieve a differentiation of the characteristic ranges in the most simple manner.

Instead of Hall-effect sensors, other sensors are also possible for evaluating the switching state of the deactivation switch. In addition to evaluations that exploit a magnetic effect, contactless concepts exploiting optical effects are possible as well. Also possible are switching evaluations which are based on mechanical stresses and which are able to transform these into electrical characteristic quantities.

In a block diagram, the FIGURE now shows the switch according to the present invention which is connected to a signal evaluation unit. An airbag deactivation switch 2 is supplied with voltage via a connection 1. Normally, energy from the car battery voltage is tapped for this purpose. Airbag deactivation switch 2 has two Hall-effect sensors HS1 and HS2, a switch 4 operable by the user, a resistor R3 as well as two external connection terminals L1 and L2. Voltage supply 1 branches off to the two Hall-effect sensors HS1 and HS2. Hall-effect sensor HS1 gives off a current I1 which flows to resistor R3 and connection terminal L1. On its other side, resistor R3 is connected to ground. Connection terminal L1 is connected via a line to a control unit 3, namely, to a connection terminal 9, which is on the one hand connected to a measuring resistor R3 and on the other hand to a signal evaluation unit 10.

Signal evaluation unit 10 processes and evaluates the Hall-effect sensor signal. Hall-effect sensor HS2 gives off a current I2. This current flows to connection terminal L2 which is connected via a line to control unit 3, namely, to a connection terminal 8. From this connection terminal 8, a resistor R2 branches off to ground on the one hand, while on the other hand a connection branches off to signal evaluation unit 10. Switch 4 is switchable between the two Hall-effect sensors HS1 and HS2 and is connected to a magnet so as to generate different Hall currents via the Hall-effect in the two Hall-effect sensors HS1 and HS2. A parallel connection of resistors R1 and R3 is provided between Hall-effect sensor HS1 and signal evaluation unit 10. These resistors form a current divider which ensures that although Hall-effect sensor HS1 gives off the same current I1, a smaller current flows to signal evaluation unit 10. Current divider R1, R3 is configured in such a way that the current that flows to signal evaluation unit 10 can never become as great as current I2 flowing from Hall-effect sensor HS2 to resistor R2 and signal evaluation unit 10.

As measuring parameters for recording the switching state, voltages are used that drops across resistors R1 and R2. To this end, the inputs of signal evaluation unit 10 are highly resistive, so that the measuring current flows off almost completely to ground via resistors R1 and R2.

By virtue of the different wiring configurations it is always possible to identify Hall-effect sensor HS1 and Hall-effect sensor HS2 due to the current given off. Thus if the airbag deactivation switch is set to "off", i.e. if all airbags are active, then switch 4 will be in the position indicated in the FIGURE. From the currents one can see that Hall-effect sensor HS1 gives off a measuring current within the prescribed characteristic range. If the airbag deactivation switch is active, however, then the position of switch 4 is at Hall-effect sensor HS2. This also provides an unequivocal signal pattern at the outputs L2 and L1. In particular, it is thus readily possible to detect mixed up lines between connection terminals L1 and L2 as well as 8 and 9. This allows for an error detection and increases operational safety. In place of the current divider presented here, voltage dividers are conceivable as well.

What is claimed is:

1. A switch assembly for switching off at least one airbag, comprising:
    a switch; and
    two identical contactless sensors, including a first sensor and a second sensor, each configured to detect a switching state of the switch;
    a first resistor network, comprising a first resistor, connected to an output of the first sensor; and
    a second resistor network, comprising a second resistor, connected to an output of the second sensor,
    wherein resistors of the first and second resistor networks are connected in such a way that a possible range of an electrical characteristic quantity, to be evaluated at an output of the first sensor for detecting the switching state of the switch, does not overlap a possible range of the electrical characteristic quantity, to be evaluated at an output of the second sensor for detecting the switching state of the switch, for any switching state of the switch.

2. The switch assembly as recited in claim 1, further comprising:
    at least one signal evaluation unit for evaluating the electrical characteristic quantity.

3. The switch assembly as recited in claim 2, wherein:
    the first resistor network includes a third resistor, the first resistor and the third resistor forming a current divider.

4. The switch assembly as recited in claim 3, wherein the third resistor is situated in a switch unit comprising the switch.

5. The switch assembly as recited in claim 1, wherein the two identical sensors are Hall-effect sensors.

6. The switch assembly of claim 2, wherein the first sensor and the first resistor are connected to a first input of the signal evaluation unit, and the second sensor and the second resistor are connected to a second input of the signal evaluation unit.

* * * * *